United States Patent [19]
Kono

[11] Patent Number: 5,862,719
[45] Date of Patent: Jan. 26, 1999

[54] STEEL CONNECTING ROD

[75] Inventor: Shingo Kono, Iwata, Japan

[73] Assignee: NTN Corporation, Osaka, Japan

[21] Appl. No.: 749,550

[22] Filed: Nov. 15, 1996

[30]   Foreign Application Priority Data

Feb. 29, 1996 [JP] Japan .................................. 8-071221
Aug. 29, 1996 [JP] Japan .................................. 8-248575

[51] Int. Cl.$^6$ ............................................. G05G 1/00
[52] U.S. Cl. ................................. 74/579 E; 74/579 R
[58] Field of Search ........................ 74/579 R, 579 E, 74/597

[56]          References Cited

U.S. PATENT DOCUMENTS 4,369,742  1/1983  Everts ............................. 74/579 E X

FOREIGN PATENT DOCUMENTS

| 658462 | 3/1938 | Germany | 74/579 E |
| 3006240 | 8/1981 | Germany | 74/579 E |
| 526309 | 9/1940 | United Kingdom | 74/579 E |

OTHER PUBLICATIONS

Patent Abstract of Japan: Publication # JP60130442; Appl'n. # JP830238469; vol. 9; No. 290, Jul. 11, 1985.
Patent Abstract of Japan: Pub. # JP57173610; Appl. # JP810058208; vol. 7; No. 16, Oct. 26, 1982.

*Primary Examiner*—Vinh T. Luong
*Attorney, Agent, or Firm*—Birch, Stewart, Kolasch & Birch, LLP

[57]          ABSTRACT

A steel connecting rod that is used mainly in a small-size internal combustion engine includes generally elongated first and second connecting rod forming plates (2) prepared from a steel plate by the use of a press work and having bearing holes (4, 5) defined in opposite ends of each of the first and second connecting rod forming plates (2) in the form of burrings (8, 9). The first and second connecting rod forming plates (2) are joined in face-to-face relation with each other. Bearings (10) are press-fitted into the bearing holes (4, 5) so as to straddle between the burrings (8, 9) at each end of the first and second connecting rod forming plates (2). The height (a) of a corner (11) formed at a radially inner base end of each burring (8, 9) is chosen to be smaller than the plate thickness (t) of each of the first and second connecting rod forming plates (2). Each of the first and second connecting rod forming plates (2) is made from a steel plate that is not heat-treated.

7 Claims, 7 Drawing Sheets

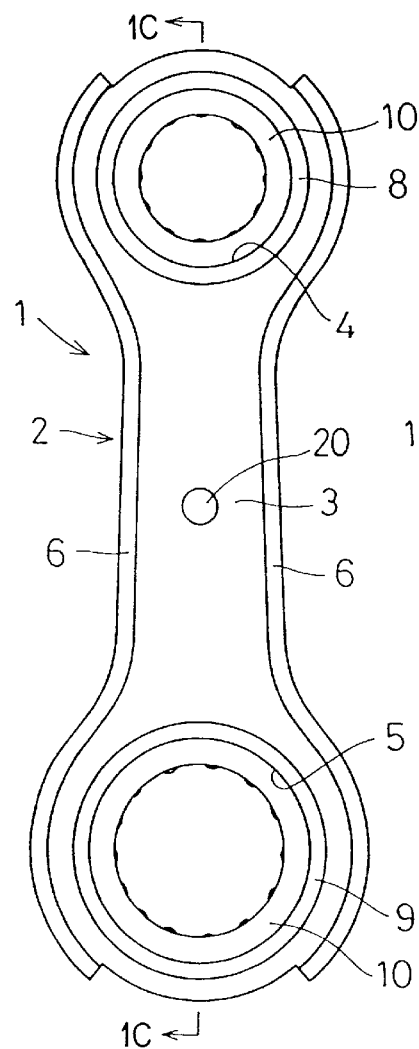
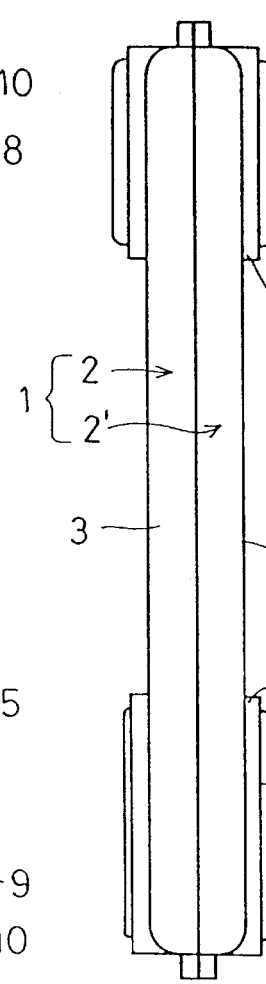
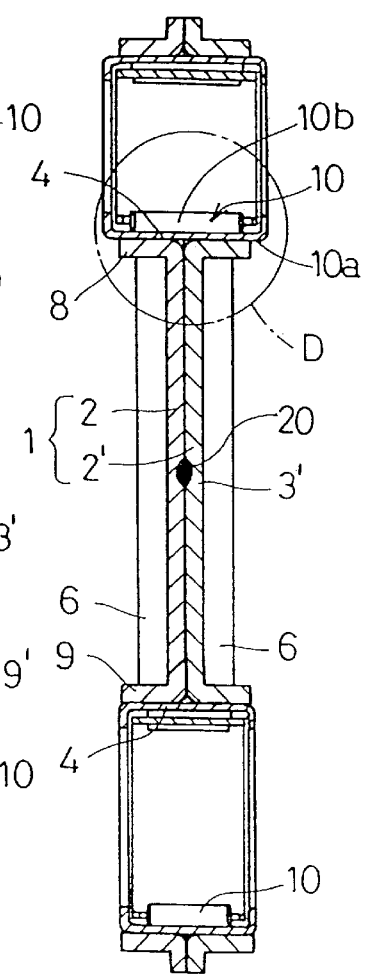
Fig. 1A  Fig. 1B  Fig. 1C
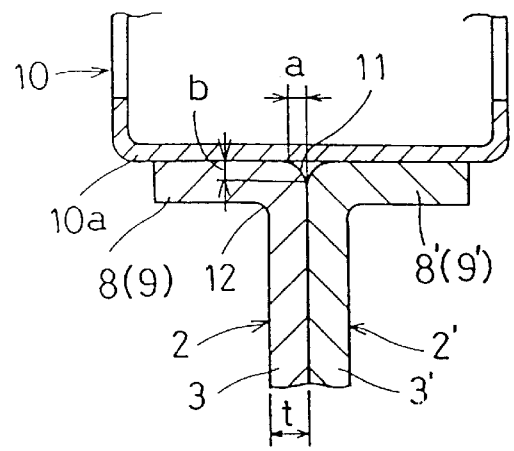
Fig. 1D

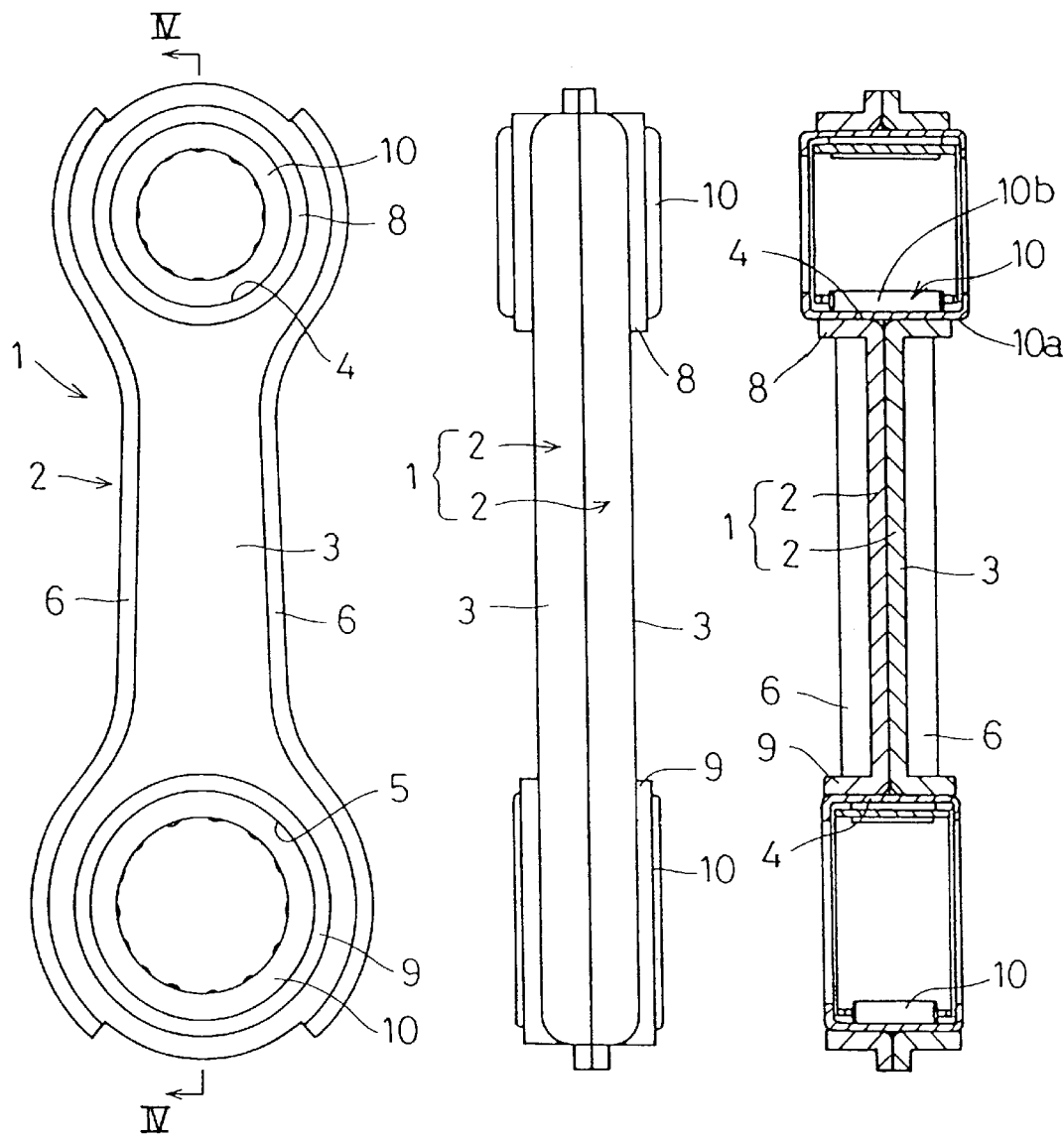

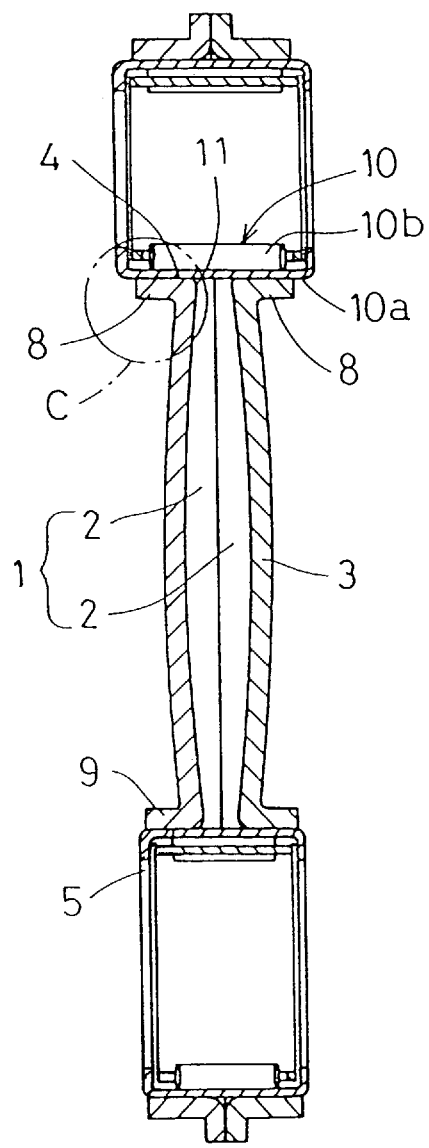
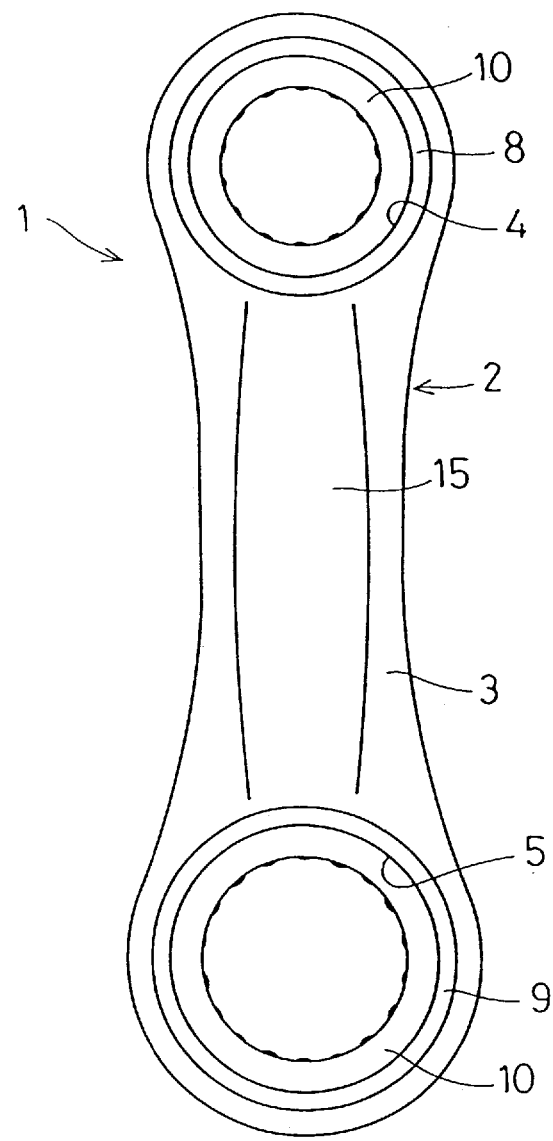

STEEL CONNECTING ROD

BACKGROUND OF THE INVENTION 1. (Field of the Invention)

The present invention generally relates to a steel connecting rod of type having its opposite ends having a bearing built therein and, more particularly, to the steel connecting rod for a small-size internal combustion engine such as used in a mower.

2. (Description of the Prior Art)

For reduction in weight and manufacturing cost, the connecting rod employed in a small-size internal combustion engine is generally of a structure comprising two connecting rod components, each in the form of an elongated steel plate, that are joined in face-to-face relation together. Different examples of the prior art connecting rods are shown in FIGS. 7A and 7B and FIGS. 8A and 8B, respectively. Each of the steel connecting rod components 51 has its opposite ends formed with respective bearing holes each being in the form of a burring 52, and a bearing (not shown) such as, for example, a shell-type needle roller bearing is press-fitted into each of the bearing holes so as to extend between the steel connecting rod components 51. For increasing the strength of a generally flattened shank 53 against buckling, the steel connecting rod components 51 are formed at side edges with respective reinforcement flanges 55 as shown in FIG. 7A or formed at a longitudinal mid-center area with reinforcement ribs 56 as shown in FIGS. 8A and 8B.

However, when the bearing load is large, the burrings 52 tend to exhibit an insufficient strength. Increase of the plate thickness may result in increase of the strength, but the increase of the plate thickness is often limited because of a shaping work in a limited space and also because of the necessity of reducing the weight. Although it may be contemplated to increase the strength by the use of a heat treatment, the heat treatment may be accompanied by reduction in precision to which the machining is carried out and, therefore, increase in strength by the use of the heat treatment cannot be achieved without sacrificing the precision.

SUMMARY OF THE INVENTION

The present invention has been devised with a view to substantially eliminating the above discussed problem and is intended to provide an improved steel connecting rod wherein the strength of the burrings can be increased with no need to increase the plate thickness and without incurring any reduction in precision.

Another important object of the present invention is to increase both the rigidity and the buckling strength of the flattened shanks of the steel connecting rod by means of a simplified structure.

In order to accomplish these objects of the present invention, there is provided a steel connecting rod which comprises generally elongated first and second connecting rod forming plates each prepared from a steel plate by the use of a press work and having first and second ends opposite to each other, each of the first and second ends of each connecting rod forming plate having a bearing hole defined therein in the form of a burring. The first and second connecting rod forming plates are joined in face-to-face relation together. A bearing is press-fitted into the bearing holes defined in the first ends of the respective first and second connecting rod forming plates and also into the bearing holes defined in the second ends of the respective first and second connecting rod forming plates. A generally arcuately sectioned portion of a generally arcuate shape as viewed in longitudinal section that is formed at a radially inward base end of the burring has a height, as measured in a direction axially of the burring, which is chosen to be smaller than a plate thickness of the associated connecting rod forming plate.

Selection of the height of the arcuately sectioned portion of each burring which is smaller than the plate thickness of each connecting rod forming plate is effective to allow loads, transmitted from the bearings to the burrings are received by not only the burrings, but also the flattened shanks. For this reason, no relatively large stress set-up occur at the respective base ends of the burrings and, therefore, the strength, particularly the fatigue life, of the base end of each of the burrings can be increased. Moreover, in view of the arcuately sectioned portion having a height smaller than the plate thickness, wavy deformation of a bearing outer race which would occur when a shell-type bearing is press-fitted into each bearing hole can advantageously be minimized to thereby eliminate an edge load between opposite ends of rollers and the outer race, resulting in increase in lifetime of the bearing.

Flattened shanks of the respective first and second connecting rod forming plates may be spot-welded together. In such case, the spot welding results in firm connection between the flattened shanks of the first and second connecting rod forming plates together accompanied by increase in rigidity and buckling strength.

Each of the first and second connecting rod forming plates may have reinforcement flanges formed along respective opposite side edges thereof, in which case substantially entire surfaces of the respective flattened shanks of the first and second connecting rod forming plates which confront with each other are held in contact with each other to thereby increase the strength of the flattened shanks.

In place of the reinforcement flanges, each of the first and second connecting rod forming plates may have a press-molded reinforcement rib formed over the entire length of the flattened shank of the respective connecting rod forming plate so as to extend from a base end of one burring to a base end of the other burring. The use of the press-molded reinforcement rib in each of the first and second connecting rod forming plates is effective to increase the strength of the associated flattened shank and, moreover, a portion of the load acting on the burrings can be born by the reinforcement ribs to contribute to increase in strength of the burrings.

Preferably, the reinforcement rib in each of the first and second connecting rod forming plates is positioned intermediate of the width of the associated flattened shank and the respective flattened shanks of the first and second connecting rod forming plates are then spot-welded together at locations on respective opposite sides of the associated reinforcement rib to thereby further increase the strength of the flattened shanks.

Where the reinforcement rib is so shaped as to represent a generally arcuate cross-sectional shape, any possible localized deformation of the flattened shank of each of the first and second connecting rod forming plates during the press work can advantageously be minimized to attain a sufficient strength of the associated flattened shank.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 1A is a front elevational view of a steel connecting rod according to a first preferred embodiment of the present invention;

FIG. 1B is a side view of the steel connecting rod shown in FIG. 1A;

FIG. 1C is a cross-sectional view of the steel connecting rod taken along the line 1C—1C in FIG. 1A;

FIG. 1D is a fragmentary longitudinal sectional view, on an enlarged scale, of a portion of the steel connecting rod which is enclosed by the single-dotted circle D in FIG. 1C;

FIG. 4A is a front elevational view of the steel connecting rod according to a second preferred embodiment of the present invention;

FIG. 4B is a side view of the steel connecting rod shown in FIG. 4A;

FIG. 4C is a cross-sectional view of the steel connecting rod taken along the line IV—IV in FIG. 4A;

FIG. 6A is a longitudinal sectional view of the steel connecting rod according to a fourth preferred embodiment of the present invention:

FIG. 6B is a front elevational view of the steel connecting rod shown in FIG. 6A;

DETAILED DESCRIPTION OF THE EMBODIMENTS

Figure 2A:
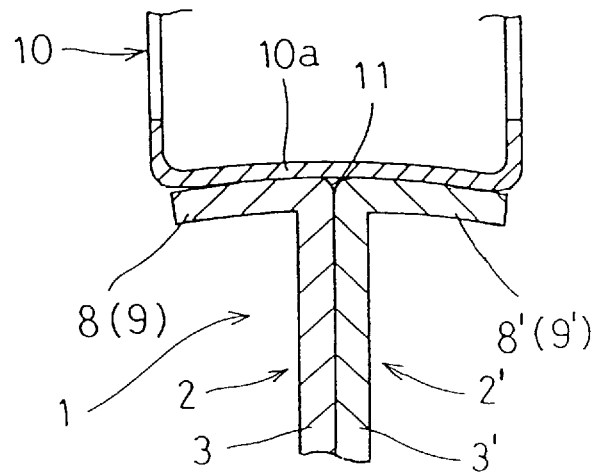
FIGS. 2A and 2B are fragmentary longitudinal sectional views, showing the manner in which outer races are deformed when the steel connecting rod according to the present invention and the prior art steel connecting rod are employed, respectively.

A first preferred embodiment of the present invention will first be described with reference to FIGS. 1A to 1D. A steel connecting rod 1 according to the first preferred embodiment of the present invention comprises generally elongated first and second connecting rod forming plates 2,2' joined in face-to-face relation with each other, each of said first and second connecting rod forming plates 2,2' being prepared from a steel plate by the use of a press work. Each connecting rod forming plate 2,2' comprises a generally flattened shank 3,3' having its opposite ends formed with respective first and second bearing holes 4 and 5 of different diameters, the first bearing hole 4 having a diameter greater than that of the second bearing hole 5.

The flattened shanks 3,3' of the respective first and second connecting rod forming plates 2,2' are held in face-to-face contact with each other over the entire length thereof and are then spot-welded together by means of a single spot-welded joint 20 located generally intermediate of the length of each connecting rod forming plate 2,2' and also intermediate of the width thereof The opposite ends of each connecting rod forming plate 2,2' where the first and second bearing holes 4 and 5 are formed, respectively, are radially outwardly enlarged to a respective outer diameter greater than the width of the associated flattened shank 3' 31. Each connecting rod forming plate 2,2' has its opposite side edges formed with a reinforcement flange 6 so as to protrude a distance in a direction perpendicular to a surface of the respective connecting rod forming plate 2,2' and so as to extend from a portion of the associated side edge thereof generally laterally of the first bearing hole 4 to a portion of the associated side edge thereof generally laterally of the second bearing hole 5. Peripheral lip region of each connecting rod forming plate 2,2' around the first and second bearing holes 4 and 5 are formed by a press work with respective round burrings 8,8' and 9,9' protruding in a direction conforming to the direction of protrusion of the reinforcement flanges 6.

Bearings 10 are firmly retained inside the first and second bearing holes 4 and 5 of each of the first and second connecting rod forming plates 2,2', respectively, in the form as press-fitted into the burrings 8 and 9 that are integral with the respective connecting rod forming plate 2,2' in coaxial relation with the associated first and second bearing holes 4 and 5. In addition to the spot-welded joint 20, the press-fitted contact between the bearings 10 and the burrings 8 and 9 accomplishes an additionally firm connection between the first and second connecting rod forming plates 2,2'.

Figure 3A:
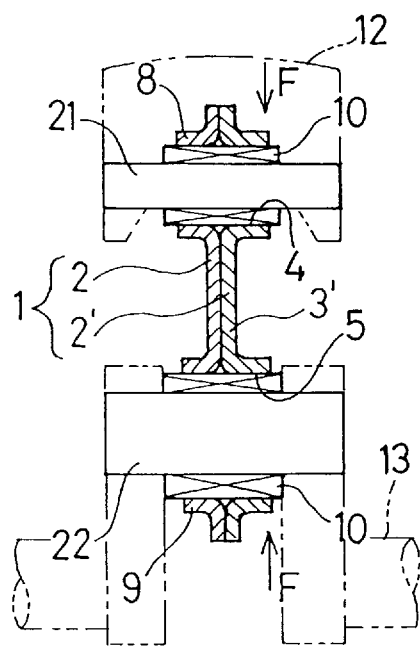
FIG. 3A is a longitudinal sectional view showing the manner in which the steel connecting rod shown in FIGS. 1A to 1C are used.

In the illustrated embodiment, each of the bearings 10 is in the form of a needle roller bearing and, in an assembled condition, a thin-walled steel outer race 10a of the needle roller bearing is retained by the burrings 8,8' and 9,9' by interference fit. Of the bearings 10, the bearing 10 received at a reduced-diameter end of the steel connecting rod 1 where the bearing holes 4 are formed is operatively connected with a piston pin 21 mounted on a piston 12 of an internal combustion engine as shown in FIG. 3A whereas the other bearing 10 received at a large-diameter end of the steel connecting rod 1 where the bearing holes 5 are formed is operatively connected with a crank pin 22 of a crankshaft 13.

In the steel connecting rod 1 so assembled in the manner as described above, as shown in FIG. 1D, the height a of a corner 11 of a generally arcuate shape as viewed in longitudinal section that is formed at a radially inward base end of each burring 8,8' and 9,9', which height a is measured in a direction axially of the respective burring 8 and 9, is chosen to be smaller than the thickness t of each connecting rod forming plate 2,2'. Although the corner 11 represents a shape similar to the shape of a quarter of the circle, the axial height a is smaller than the radius of curvature of the corner 11. However, the width b of the arcuate corner 11 measured in a direction radially of the respective burrings 8,8' and 9,9' may be either greater or smaller than the axial height a.

The steel connecting rod 1 has an overall length which may range from, for example, a few tens of millimeters to a few hundreds of millimeters. Each of the first and second connecting rod forming plate 2,2' is preferably made from a steel plate which is not heat-treated and a cold rolled steel plate (SPCC, SPCD, SPCE) defined in the Japanese Industrial Standards (JIS) or a workable cold-rolled high-tensile steel plate (for example, SPFC or the like) for automobile use may be employed therefor.

The operation of the steel connecting rod 1 of the above described construction will now be described. Since in this steel connecting rod 1 of the above described construction the height a of the corner 11 formed at the base end of each of the burrings 8,8' and 9,9' is chosen to be smaller than the plate thickness t, loads transmitted from the bearings 10 to the burrings 8,8' and 9,9' are received by not only the burrings 8,8' and 9,9', but also the flattened shanks 3,3'. For this reason, relatively large stress do not occur at the respective base ends of the burrings 8,8' and 9,9' and, therefore, the strength, particularly the fatigue life, of the base end of each of the burrings 8,8' and 9,9' can be increased. In other words, the lifetime until occurrence of cracking and/or failure can be increased. Improvement in fatigue life will be shown by way of test results later.

Selection of the lower height a of the corner 11 of each of the burrings 8 and 9 is effective to increase the lifetime of the bearings as compared with the case in which the height a is relatively large. In other words, if the height a of the corner 11 is large, as shown in FIG. 2B, the gap between the neighboring burrings 8,8' and 9,9' in the respective connecting rod forming plates 2,2' increases and, therefore, when the associated bearing 10 is press-fitted into the neighboring burrings 8,8' and 9,9' a peripheral wall of the bearing outer race 10a will be undulated along a generatrix thereof. Also, if the height a is large, the base end of each of the neighboring burrings 8,8' and 9,9' will exhibit such a relatively low rigidity as to allow the neighboring burrings 8,8' and 9,9' to easily flex to expand and, once this occurs, the bearing outer race 10a will follow the flexure of the neighboring burrings 8,8' and 9,9', accompanied by undulation of the peripheral wall of the bearing outer race 10a along the generatrix thereof. For these reasons, local contact as shown by the arrow P in FIG. 2B takes place between portions adjacent opposite ends of needle rollers 10b and the outer race 10a, eventually resulting in reduction in lifetime of the bearings 10.

Figure 2B:
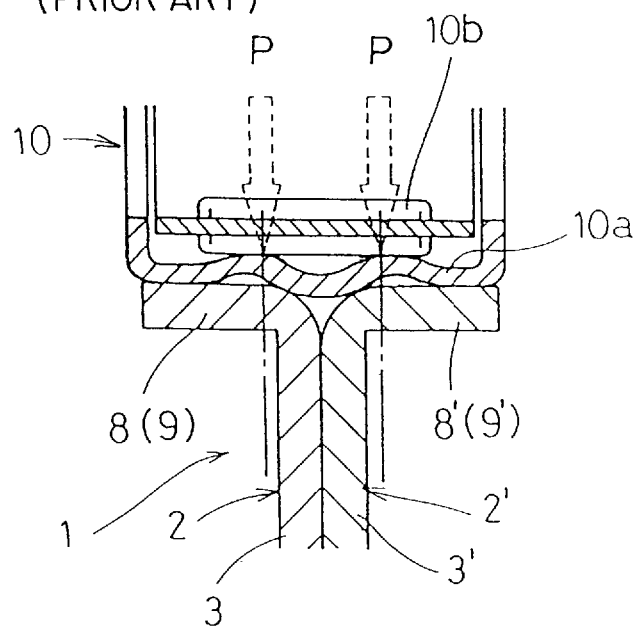

In contrast thereto, where the height a of the corner 11 is chosen to be small, a portion of the bearing outer race 10a intermediate between the opposite ends thereof is moderately curved, as shown in FIG. 2A (representing a crowning shape), to thereby exhibit a somewhat small diameter. For this reason, local contact between those portions adjacent opposite ends of needle rollers 10b and the outer race 10a is advantageously minimized, thereby lessening an edge load. Because of this feature, the lifetime of the bearings 10 can be increased.

Also, since the steel connecting rod 1 is formed by spot-welding respective intermediate portions of the first and second connecting rod forming plates 2,2' together, the first and second connecting rod forming plates 2,2' are firmly integrated together to such an extent as to exhibit an increased rigidity and, also, a buckling strength. In other words, as shown in FIG. 3A, by the effect of a pressure of a combustion gas acting on the piston 12, a relatively high compressive load F acts on the flattened shanks 3,3' of the steel connecting rod 1 between the piston pin 21 and the crankshaft 22. Against this compressive load F, where no spot-welded joint 20 is used to connect the first and second connecting rod forming plates 2,2' together, the first and second connecting rod forming plates 2 tend to separate away from each other as shown in FIG. 3C and the buckling strength is therefore low. On the contrary, when the spot-welded joint 20 is employed to connect the first and second connecting rod forming plates 2,2' together such as accomplished in the present invention, the first and second connecting rod forming plates 2,2' tends to bend together with each other in overlapped relation as shown in FIG. 3D, exhibiting a substantially increased buckling strength.

Figure 3B:
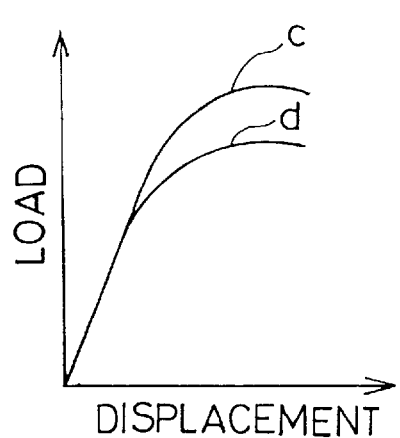
FIG. 3B is a characteristic graph showing the relationship between the compressive load and the bucking displacement both acting on the steel connecting rod.
Figure 3C:
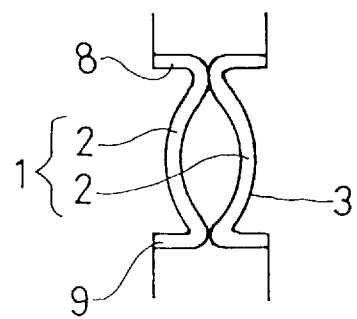
FIG. 3C is a fragmentary longitudinal sectional view of a portion of the steel connecting rod, showing how generally flattened shanks are buckled where no spot welding is employed.
Figure 3D:
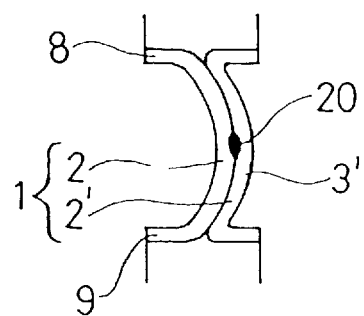
FIG. 3D is a fragmentary longitudinal sectional view of a similar portion of the steel connecting rod, showing how the flattened shanks are buckled where the spot welding is employed.
Figure 5A:
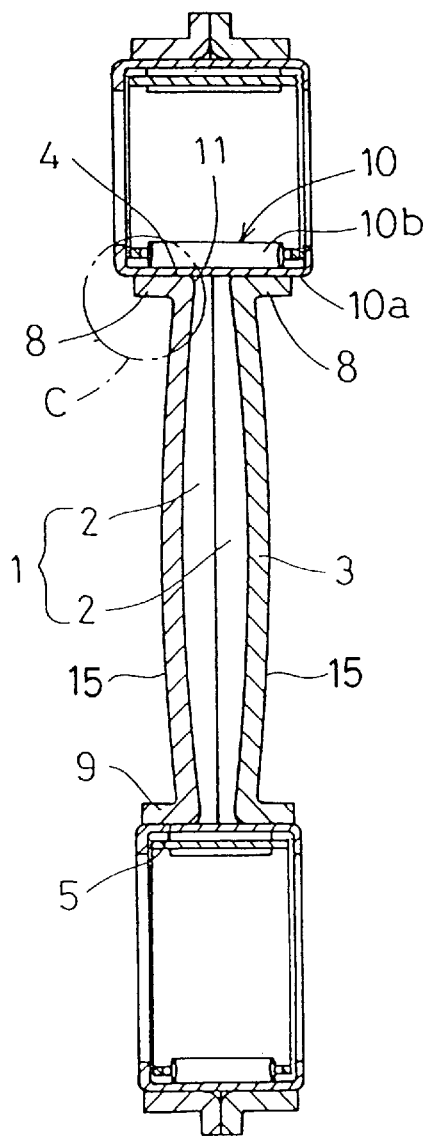
FIG. 5A is a front elevational view of a steel connecting rod according to a third preferred embodiment of the present invention.
Figure 5B:
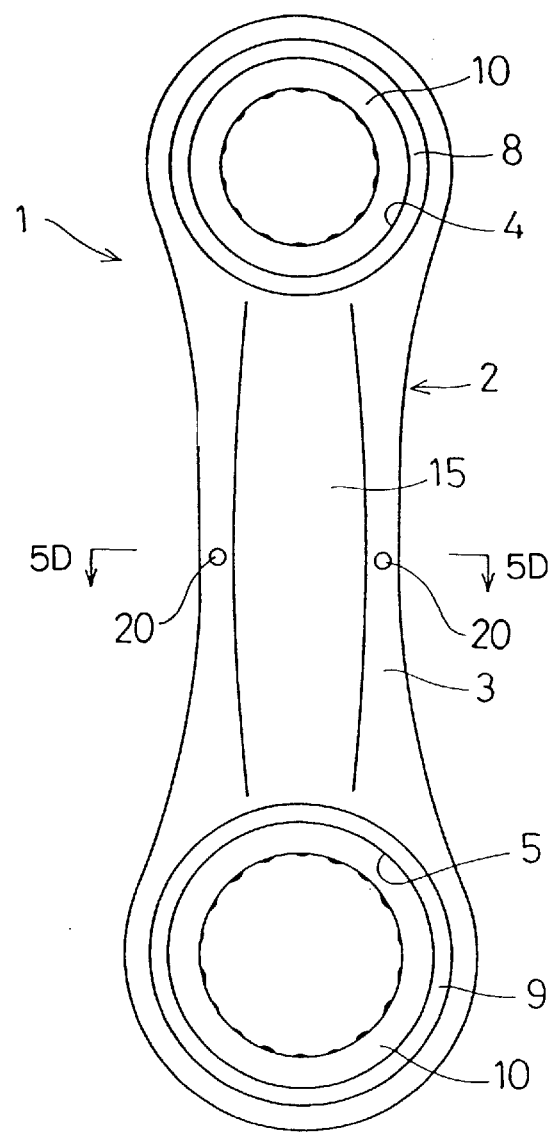
FIG. 5B is a side view of the steel connecting rod shown in FIG. 5A.
Figure 5C:
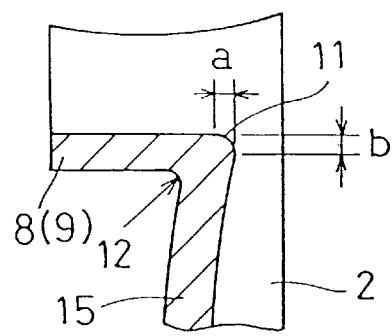
FIG. 5C is a fragmentary longitudinal sectional view, on an enlarged scale, of a portion of the steel connecting rod which is enclosed by the single-dotted circle C in FIG. 5A.
Figure 5D:
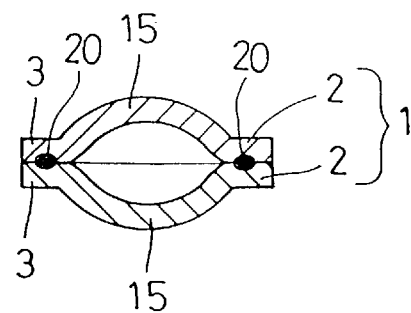
FIG. 5D is a cross-sectional view of the steel connecting rod taken along the line D—D in FIG. 5B.
Figure 7A:
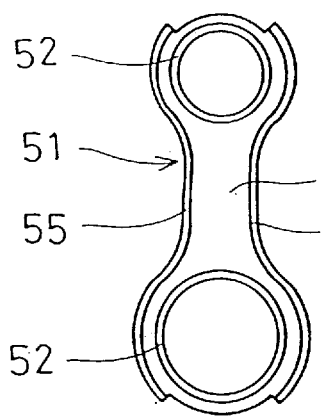
FIGS. 7A and 7B are front elevational and longitudinal sectional views of one prior art steel connecting rod, respectively.
Figure 7B:
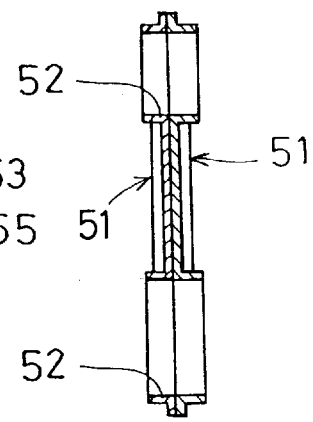
Figure 8A:
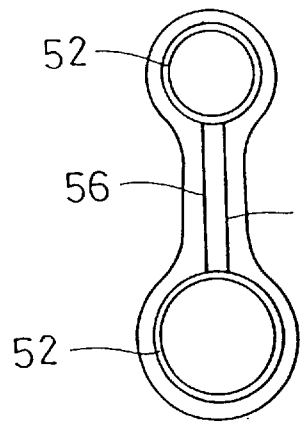
FIGS. 8A and 8B are front elevational and longitudinal sectional views of another prior art steel connecting rod, respectively.
Figure 8B:
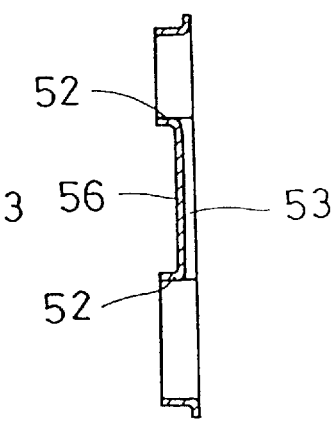

By way of example, where the spot-welded joint 20 is employed, the amount of displacement which takes place in a bending direction under the influence of the compressive load is small as shown by a curve c in FIG. 3B, whereas where no spot-welded joint 20 is employed, the amount of displacement under the influence of the compressive load is large as shown by a curve d in FIG. 3B. Thus, it will readily be understood that with a simple structure wherein only one spot-welded joint 20 is employed, both of the rigidity and the buckling strength can be increased. Also, because of the use of a spot-welding technique to form the spot-welded joint 20, a problem associated with weld strains is minimized unlike that occurring with a soldering or brazing technique.

It is, however, to be noted that the use of the spot-welded joint 20 may not be essential in the practice of the present invention. FIGS. 4A to 4C illustrate a second preferred embodiment of the present invention in which the use of the spot-welded joint 20 necessitated in the structure of the steel connecting rod 1 according to the foregoing embodiment of the present invention is eliminated. In this second embodiment of the present invention, the press-fitting of the bearings 10 into the burrings 8,8' and 9,9' permits the bearings 10 to connect the first and second connecting rod forming plates 2,2' together. Other than the presence or absence of the spot-welded joint 20, the steel connecting rod 1 according to the second embodiment of the present invention is substantially similar to that according to the foregoing embodiment of the present invention in structural features and effects.

FIGS. 5A to 5D illustrate a third preferred embodiment of the present invention. In this embodiment, each of the first and second connecting rod forming plates 2,2' has a reinforcement rib 15 of a generally arcuate cross-sectional shape formed therein so as to extend over the entire length of the associated flattened shank 3. A circumferential portion of the base end of each of the burrings 8,8' and 9,9' is displaced towards a free end thereof to thereby define a corresponding end of the reinforcement rib 15, wherefor the associated reinforcement rib 15 is formed so as to extend from the base end of one burring 8,8' to the base end of the neighboring burring 9,9'. The reinforcement rib 15 in each of the flattened shanks 3,3' is formed by the use of a press work at a location intermediate of the width of the respective flattened shank 3,3'. The flattened shanks 3,3' are spot-welded together by means of two spot-welded joints 20 that are formed intermediate of the length of the flattened shanks 3,3' and on respective sides of the reinforcement ribs 15. Other structural features of the steel connecting rod 1 according to the third embodiment of the present invention are similar to those of the steel connecting rod 1 according to the first embodiment of the present invention.

Even with the structure shown in and described with reference to FIGS. 5A to 5D, as is the case with any one of the foregoing embodiments of the present invention, the corner 11 of each of the burrings 8,8' and 9,9' has a height a smaller than the plate thickness and, therefore, not only can the fatigue life of the burrings 8,8' and 9,9' be increased, but the bearing lifetime can also be increased.

It is, however, to be noted that even in the case where the reinforcement ribs 15 are formed in the respective flattened shanks 3,3' such as in the third embodiment of the present invention, the use of the spot-welded joints 20 may be eliminated to allow the press-fitting of the bearings 10 into the burrings 8,8' and 9,9' to permit the bearings 10 to connect the first and second connecting rod forming plates 2,2' together such as shown in FIGS. 6A and 6B according to a fourth preferred embodiment of the present invention.

Example

Table 1 below illustrates results of the fatigue test conducted on two kinds of connecting rod samples; one kind being the steel connecting rods according to the second embodiment of the present invention, wherein the height a of the base end of each burring is smaller than the plate thickness t, and the other being comparative steel connecting rods wherein the height a of the base end of each burring is greater than the plate thickness t. Figures in Table 1 show the number of loading cycles at which fatigue failure occurred. The results of the fatigue test have shown that if the height a is chosen to be smaller than the plate thickness t, the fatigue life of the steel connecting rod 1 can be increased four to five times. Particulars of each kind of the sample connecting rods tested are as follows.
Connecting Rod of the Invention:
  Height a: 1.0 mm
  Plate Thickness t: 1.2 mm
  Ratio a/t: 83%
Comparative Connecting Rod:
  Height a: 1.3 mm
  Plate Thickness t: 1.2 mm
  Ratio a/t: 108%
The both are made of SPCC. The fatigue test was conducted under a load condition in which a compression of 530 kgf and a tension of 100 kgf were applied.

The two sample connecting rods of those kinds (indicated by No. 1 and No. 2, respectively, in Table 1) were prepared from steel plates selected from different production lots and subsequently subjected to a burring process.

TABLE 1

| | a > t | a < t |
|---|---|---|
| No. 1 | $1.03 \times 10^7$ cycles | $3.89 \times 10^7$ cycles |
| No. 2 | $0.72 \times 10^7$ cycles | $4.05 \times 10^7$ cycles |

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A steel connecting rod which comprises:

elongated first and second connecting rod forming plates, each plate made of steel and having first and second ends opposite to each other, each of said first and second ends of each connecting rod forming plate having a bearing hole defined therein in the form of a burring, said first and second connecting rod forming plates being joined in face-to-face relation together;

a needle roller bearing with a thin-walled outer race being press-fitted into said bearing holes defined in said first ends of the respective first and second connecting rod forming plates and also into said bearing holes defined in said second ends of the respective first and second connecting rod forming plates; and an arcuate sectioned corner portion formed at a radially inward base end of each burring has a height measured in a direction axially of the burring, said height is smaller than a plate thickness of a respective connecting rod forming plate.

2. The steel connecting rod as claimed in claim 1, wherein each of the first and second connecting rod forming plates has a flattened shank, and spot-welds connect the flattened shanks of the respective first and second connecting rod forming plates together.

3. The steel connecting rod as claimed in claim 1, wherein each of said first and second connecting rod forming plates has a reinforcement flange formed along opposite side edges thereof and surfaces of the respective flattened shanks of the first and second connecting rod forming plates which confront with each other are held in contact with each other.

4. The steel connecting rod as claimed in claim 1, wherein each of the first and second connecting rod forming plates has a generally flattened shank, and wherein each of the first and second connecting rod forming plates has a press-molded reinforcement rib formed over the entire length of the flattened shank of the respective connecting rod forming plate so as to extend from a base end of one burring to a base end of the other burring.

5. The steel connecting rod as claimed in claim 4, wherein said reinforcement rib in each of the first and second connecting rod forming plates is positioned intermediate of the width of the associated flattened shank and wherein the respective flattened shanks of the first and second connecting rod forming plates are spot-welded together at locations on respective opposite sides of the associated reinforcement rib.

6. The steel connecting rod as claimed in claim 4, wherein the reinforcement rib is of a generally arcuate cross-sectional shape.

7. The steel connecting rod as claimed in claim 1, wherein said bearings and said burrings have a concaved crown shape, whereby edge loads on said bearings are decreased.

* * * * *